United States Patent

[11] 3,571,864

[72] Inventor Rene Emile Henri Oger
 St. Cloud, France
[21] Appl. No. 823,690
[22] Filed May 12, 1969
[45] Patented Mar. 23, 1971
[73] Assignee U. S. Philips Corporation
 New York, N.Y.
[32] Priority May 27, 1968
[33] France
[31] 153058

[54] FASTENER
 5 Claims, 5 Drawing Figs.
[52] U.S. Cl. .................................................. 24/221
[51] Int. Cl. ............................................. A44b 17/00
[50] Field of Search ........................................ 24/221,
 221.2, (Inquired)

[56] References Cited
 UNITED STATES PATENTS
 2,282,360 5/1942 Horrocks ..................... 24/221
 2,560,519 7/1951 Bedford ..................... 24/221.2

Primary Examiner—George F. Mautz
Attorney—Frank R. Trifari

ABSTRACT: A device which is based on the bayonet principle for fastening an at least partially panel-shaped member to a fixed member by means of a key-shaped stud having a lateral projection or bit provided on the shank, which stud can be passed through subsequent holes in the panel and in the fixed member, which holes allow the passage of the shank and the projection, and subsequently after rotation of the shank the projection can engage in a recess in a resilient element of the fixed member so that withdrawal of the stud is prevented.

PATENTED MAR 23 1971 3,571,864

INVENTOR.
RENE E. H. OGER
BY
AGENT

FASTENER

The invention relates to a device which is based on the bayonet principle for fastening an at least partially panel-shaped member to a fixed member by means of a key-shaped stud having a lateral projection or bit provided on the shank, which stud can be passed through subsequent holes in the panel and in the fixed member, which holes allow the passage of the shank and the projection, and subsequently after rotation of the shank the projection can engage in a recess in a resilient element of the fixed member so that withdrawal of the stud is prevented.

It is an object of the invention to provide such a device which is cheap, consists of only two component parts and occupies little space.

The device according to the invention is characterized in that the fixed member comprises a bush having at one end an annular axially resilient portion which is connected with the remainder of the bush through a small part only of its circumference and is provided with a recess which is located diametrically opposite the said small part and in which the lateral projection of the stud inserted into the bush can engage.

Features and advantages of the invention will appear from the following description of an embodiment thereof, given by way of example only, with reference to the accompanying drawings, in which.

Figure 1:
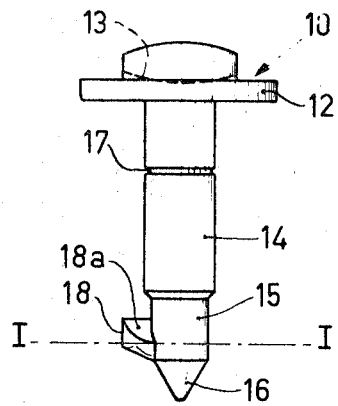
FIG. 1 is a front elevation and FIG. 2 a bottom plan view of a key-shaped stud which forms part of a device according to the invention.

Referring to FIG. 1, there is shown a stud or key 10 which is provided with a head 12 having a slot 13 formed in it for a screwdriver and with a cylindrical shank 14 which terminates in another cylindrical portion 15 of smaller diameter which again terminates in a conical portion 16. By means of a screwdriver placed in the slot 13 the stud may be rotated about its axis.

The second cylindrical portion 15 is provided with a lateral projection or bit 18 at the side facing the head 12. The bit has a double bevel or a rounded surface. In FIG. 1, a surface 18a is one of the surfaces formed by the double bevelling.

Figure 4:
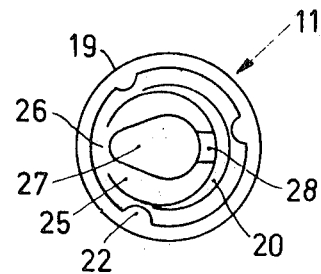

A bush 11 which externally is substantially circular has a collar 19 which forms a flange on a central portion 20 which is provided with circumferential ribs 21 which may be gapped at for example three points 22 (visible in FIG. 4). The gaps are provided to prevent the bush from following a rotation movement imparted to the stud. The shape of the ribs 21 is such that the bush 11, which may be made of plastic material, may readily be placed in position, for example by driving, after which edges 23 resist removal of the bush.

Figure 3:
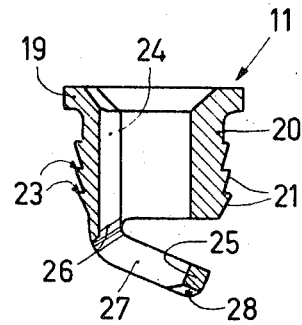
FIG. 3 is a longitudinal sectional view and FIG. 4 a bottom plan view of a bush which also forms part of a device according to the invention.
Figure 2:
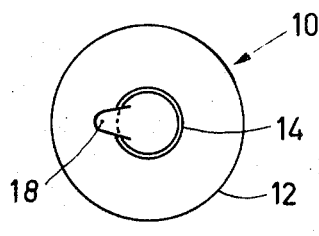

The cylindrical inner surface of the portion 20 has a diameter which is slightly larger than that of the shank 14 of the stud 10 and is provided with a groove-shaped widened portion 24, visible in FIG. 3, through which the bit 18 can freely move when the stud 10 is being inserted into the bush 11.

The central portion 20 of the bush 11 at its lower end terminates in an annular slightly resilient portion 25 which is connected to the portion 20 through a small part 26 of its circumference only. This ring 25 has a central aperture 27 the shape of which substantially corresponds to the shape of the central portion 20 and of the stud 10 at the level of a line I—I in FIG. 1. In the lower surface of the ring 25 is provided a recess 28 which opens into the aperture 27 and is shaped so that the upper portion of the bit 18 comprising the surface 18a of the stud 10 can nestle therein.

Figure 5:
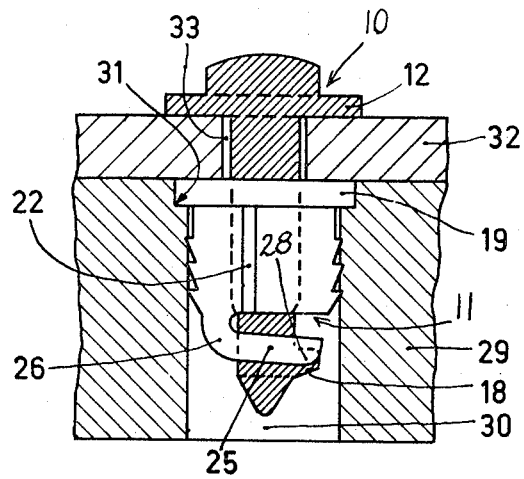
FIG. 5 shows the stud and the bush in the locked condition.

In one of the members to be fastened together—the element 29 in FIG. 5—a hole 30 has been drilled the diameter of which is slightly smaller than the outer diameter of the central portion 20 of the bush 11 and the upper end of which terminates in a chamber 31 in which the collar 19 of the bush fits. The bush 11 is inserted in the hole 30, for example by driving. The ribs 21 catch in the preferably softer material of the member 29, which may consist of soft wood. A second member 32 to be fastened is provided with a hole 33 through which the stud 10 can be inserted into the bush 11 in a position in which the bit 18 registers with the groove 24; when the stud has been inserted as far as possible it is rotated through 180° so that the bit 18 locks in the recess 28 of the axially resilient ring 27 (see FIG. 5).

The maximum depth through which the bush 11 can be introduced into the hole 30 must be such that, when the stud is entirely inserted and slightly rotated but not yet locked, the inclined surface 18a of the bit 18 bears on the lower surface of the ring 25 of the bush.

During the movement through 180° which the bit 18 performs from the portion 26 of the bush to the recess 28, it exerts a force on the ring 25 which causes this ring to bend upwards. The ring exerts a downward force on the bit 18 so that the head 12 of the stud is urged against the upper surface of the member 32, which consequently is clamped to the member 29.

The ring 25 must be capable of moving in the hole 30 without pinching and hence the outer diameter of the ring is slightly smaller than that of the central portion 20 of the bush. Accordingly the diameter of the end portion 15 of the stud 10, which portion must pass through the ring 25, preferably is smaller than that of the portion 14.

The shank 14 is formed with a circumferential groove 17 in which a gapped resilient ring can be arranged to secure the stud 10 permanently to the panel 32 in known manner. At its upper end the bore in the bush 11 has a conical widened portion in which the resilient ring can nestle.

I claim:

1. A device for fastening an at least partially panel-shaped member to a fixed member comprising a key-shaped stud having a lateral projection or bit provided on its shank, which stud can be passed through holes in the panel and in the fixed member, which holes allow the passage of the shank and the projection, and subsequently after rotation of the shank the projection can engage in a recess in a resilient element of the fixed member so that withdrawal of the stud is prevented, said fixed member being a bush having at one end an annular axially resilient portion which is connected to the remainder of the bush through a small part only of its circumference and is provided with a recess which is located substantially diametrically opposite the said small portion and in which the lateral projection of the stud inserted into the bush can engage.

2. A device as claimed in claim 1, wherein the shank of the stud comprises two aligned cylindrical portions, of which the portion remote from the head has a diameter smaller than that of the other portion, is provided with the lateral projection and terminates in a conical portion.

3. A device as claimed in claim 1, wherein the central portion of the bush is provided with at least one circumferential rib which acts as a barb.

4. A device as claimed in claim 3, wherein each rib is gapped at least one point of its circumference.

5. A device as claimed in claim 4, wherein the bush is made of a plastic material.